US011897739B2

(12) United States Patent
Curtis et al.

(10) Patent No.: US 11,897,739 B2
(45) Date of Patent: Feb. 13, 2024

(54) SPOOL TIPPER SYSTEMS AND METHODS

(71) Applicant: Corbins Service Electric, LLC, Phoenix, AZ (US)

(72) Inventors: Tyler Curtis, Phoenix, AZ (US); Michael Velotta, Phoenix, AZ (US)

(73) Assignee: Corbins, LLC, Phoenix, AZ (US)

( * ) Notice: Subject to any disclaimer, the term of this patent is extended or adjusted under 35 U.S.C. 154(b) by 729 days.

(21) Appl. No.: 16/984,979

(22) Filed: Aug. 4, 2020

(65) Prior Publication Data

US 2022/0041418 A1 Feb. 10, 2022

(51) Int. Cl.

*B66F 11/00* (2006.01)
*B66C 1/62* (2006.01)
*B66C 1/42* (2006.01)
*B66C 1/22* (2006.01)

(52) U.S. Cl.

CPC ................ *B66F 11/00* (2013.01); *B66C 1/22* (2013.01); *B66C 1/42* (2013.01); *B66C 1/62* (2013.01)

(58) Field of Classification Search

CPC .... B66C 1/24; B66C 1/22; B66C 1/42; B66C 1/62; B66F 11/00
See application file for complete search history.

(56) References Cited

U.S. PATENT DOCUMENTS 2,816,792 A * 12/1957 Dixon ........................ B66C 1/24 294/67.21
3,436,116 A * 4/1969 Anderson ............... B21C 47/24 414/626
3,680,907 A * 8/1972 Siegwart ................. B66C 1/485 414/626
7,222,902 B2 * 5/2007 Slezak ...................... B66C 1/24 414/910
2020/0062552 A1 * 2/2020 Roots ........................ B66C 1/24

* cited by examiner

*Primary Examiner* — Seahee Hong
(74) *Attorney, Agent, or Firm* — Snell & Wilmer L.L.P.

(57) ABSTRACT

A clamp assembly for a spool tipping system may comprise a base clamp portion and an adjustable clamp portion. The adjustable clamp portion may be adjustable relative to the base clamp portion based on a flange size of a respective spool. The adjustable clamp portion may be configured to translate through a portion of the base clamp portion and be locked to base clamp portion. The spool tipping system may comprise a lifting system configured to couple to the clamp assembly, lift the clamp assembly and the spool, and transition the spool from a side position to an upright position.

13 Claims, 8 Drawing Sheets

SPOOL TIPPER SYSTEMS AND METHODS

TECHNICAL FIELD

The present disclosure relates spool tipper systems and methods, and in particular to systems and methods for tipping a spool from a side position to an upright position.

BACKGROUND

A spool is a device around which thread, wire, or cable is wound. Spools generally comprise a first flange, a second flange, and a generally cylindrical body disposed between the first flange and the second flange. The thread, wire, or cable are generally wound around the generally cylindrical body. Spools are often assembled in a side position where the spool may not be useable. Typical spool tipping systems and methods include manually tipping a spool with several people or tipping the spool with a lever or the like. This can be time consuming, cause damage to the spool, and/or result in safety issues for people manually tipping the spool. As such, a spool tipping systems and methods may be desirable.

SUMMARY

A clamp assembly for use in a spool tipping system is disclosed herein. The clamp assembly may comprise: a base clamp portion including: a receiving portion including a receiving aperture; a first leg extending from the receiving portion to a first engagement end, the first engagement end including a first hook; and a second leg extending from the receiving portion to a second engagement end, the second engagement end including a second hook; and an adjustable clamp portion comprising a third engagement end including a third hook, the adjustable clamp portion slides within the receiving portion when the adjustable clamp portion is being adjusted.

In various embodiments, the second leg is offset from the first leg by an angle between 10 degrees and 170 degrees. The adjustable clamp portion may be configured to translate within the receiving portion and adjust a size of the clamp assembly relative to a flange of a spool. The adjustable clamp portion may be configured to engage the flange of the spool. The adjustable clamp portion may be configured to be locked in place relative to the base clamp portion during use of the spool tipping system. The adjustable clamp portion may comprise an elongated member having an array of apertures disposed therethrough. The receiving portion may comprise a lock receiving aperture disposed therethrough. An aperture in the plurality of apertures may align with the lock receiving aperture prior to coupling a locking mechanism to the clamp assembly. The spool tipping system may comprise: the clamp assembly; and a spool having a first flange, a second flange, and a generally cylindrical body extending from the first flange to the second flange, wherein the first hook, the second hook, and the third hook retain the first flange axially therebetween.

A method for a tipping a spool is disclosed herein. The method may comprise: clamping a clamp assembly to the spool; coupling the clamp assembly to a lifting system; lifting, vie the lifting system, the clamp assembly and the spool; lowering, via the lifting system, the spool and the clamp assembly; and releasing the spool from the clamp assembly in an upright position.

In various embodiments, the method may further comprise releasing the spool from the lifting system. The clamp assembly may be clamped to a flange of the spool. The clamp assembly may comprise a base clamp portion and an adjustable clamp portion, and the adjustable clamp portion may be adjusted relative to the base clamp portion to clamp the clamp assembly to the flange of the spool. Lifting the clamp assembly and the spool may further comprise actuating the spool vertically via the lifting system. The method may further comprise pivoting the spool at least partially about a connection between the clamp assembly and the lifting system in response to lifting the clamp assembly and the spool. The method may further comprise clamping the clamp assembly to the spool when the spool is in a side position, the side position including an axial surface of a flange in contact with a horizontal surface. The spool may further comprise a first flange, a generally cylindrical body, and a second flange, the generally cylindrical body extending from the first flange to the second flange. The clamp assembly may be clamped to the first flange. The second flange may contact a horizontal surface before the first flange in response to lowering the spool.

A spool tipping system is disclosed herein. The spool tipping system may comprise: a spool having a first flange disposed opposite a second flange; a clamp assembly including a first leg extending from a receiving portion to a first engagement end, a second leg extending from the receiving portion to a second engagement end, and an adjustable leg disposed in the receiving portion and having a third engagement end, wherein the first engagement end, the second engagement end, and the third engagement end engage the first flange along an outer perimeter of the first flange; and a lifting system coupled to the clamp assembly.

In various embodiments, the clamp assembly may further comprise a base clamp portion and an adjustable clamp portion, and the adjustable clamp portion may be configured to translate through the base clamp portion to adjust a clamp configuration based on a size of the first flange. The spool tipping system may further comprise a locking mechanism configured to lock a clamp in the clamp configuration prior to lifting the clamp assembly and the spool with the lifting system.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting. The contents of this section are intended as a simplified introduction to the disclosure, and are not intended to limit the scope of any claim.

BRIEF DESCRIPTION OF THE DRAWINGS

With reference to the following description and accompanying drawings.

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from principles of the present disclosure.

For the sake of brevity, conventional techniques and components may not be described in detail herein. Furthermore, the connecting lines shown in various figures contained herein are intended to represent exemplary functional relationships and/or physical couplings between various elements. It should be noted that many alternative or additional functional relationships or physical connections may be present in exemplary systems and/or components thereof.

In various exemplary embodiments, a spool tipping system may comprise a clamp assembly and a lifting system. The clamp assembly may be configured to clamp a clamping assembly to a spool. The clamping assembly may clamp to a flange of the spool circumferentially, two flanges of the spool axially, or in any other manner to grasp the spool. The clamp assembly may comprise a base clamp portion and an adjustable clamp portion. The base clamp portion may be configured to engage a portion of the spool, such as a first flange, or the like. Similarly, the adjustable clamp portion may be configured to engage a portion of the spool opposite the base clamp portion, such as the first flange, or a second flange opposite the first flange. The lifting system may comprise any component configurable to lift the clamp assembly and the spool. For example, the lifting system may comprise a forklift, a vertical lifting mechanism, or the like. Exemplary embodiments are intended to be, or function as, a spool tipping system configurable to tip a spool from a side position to an upright position. The device eases the burden of individuals dealing with tipping a spool manually or tipping a spool by any other method.

Exemplary embodiments are intended for use by individuals to automatically tip a spool with ease. The system utilizes a clamp assembly configured to be clamped manually to a respective spool and coupled to the lifting system. The system may further provide a lifting element configured to couple the lifting system to the clamping assembly, such as a strap or the like.

Figure 1:
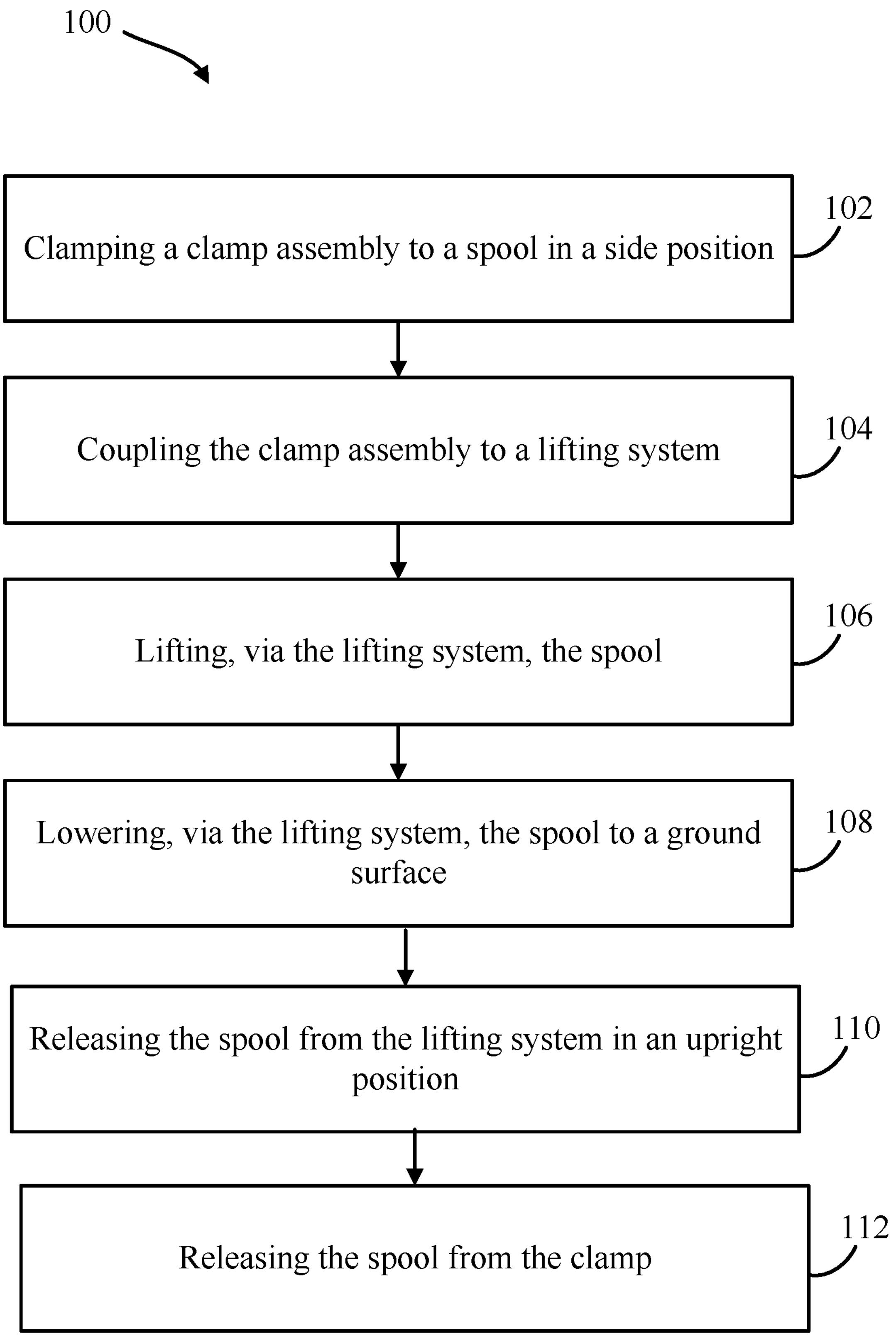
FIG. 1 illustrates a method for tipping a spool, in accordance with various embodiments.

Referring now to FIG. 1, a method 100 of tipping a spool is illustrated, in accordance with various embodiments. The method 100 comprises clamping a clamp assembly to a spool in a side position (step 102). The clamp assembly may include an adjustment system. The adjustment system may be configured to adjust a size of the clamp assembly to be complimentary to a respective spool to be tipped. In this regard, the clamp assembly may be utilized for tipping various shapes and sizes of spools. In various embodiments, the clamp assembly comprises a base clamp portion and an adjustable clamp portion. The base clamp portion may be configured to engage a first portion of the spool, such as a first flange. Similarly, the adjustable clamp portion may be configured to a engage a second portion of the spool, such as a first flange or a second flange opposite the base clamp portion. The adjustable clamp portion may be locked to the base clamp portion by a locking mechanism. The locking mechanism may be any mechanism configured to lock two components in place, such as a pin and clamp, a bolt and nut, a bolt and insert, a press fit configuration, or the like. In various embodiments, the locking mechanism may be integral to the adjustable clamp portion or the base clamp portion. In various embodiments, the locking mechanism may be a discrete component from the base clamp portion and the adjustable clamp portion. Upon locking the locking mechanism, the clamp assembly may clamp a portion of the spool, such as a flange, and in doing so couple the clamp assembly to the spool.

In various embodiments, the method further comprises, coupling the clamp assembly to a lifting system (step 104). The clamp assembly may be coupled to the lift system in any manner. For example, the clamp assembly may be coupled to a strap, a rod, or even coupled directly to the lifting system. In this regard, the clamp assembly may comprise an attachment portion, such as a hook, a loop, a flange, or any other attachable end. The attachment portion may be on the base clamp portion or the adjustable clamp portion. Although illustrated as being a component of the adjustable clamp portion herein, the clamp assembly is not limited in this regard, and one skilled in the art may appreciate that the attachment portion may be in various locations of a clamp assembly. In various embodiments, the lifting system may comprise an actuator. The actuator may be configured to translate in a vertical direction (e.g., away from and/or towards a ground surface). The actuator may be a part of a forklift, a pneumatic actuator, a linear track actuator, a rotary actuator, or any other actuator configured translate a component vertically.

In various embodiments, the method 100 further comprises lifting, via the lifting system, the spool (step 106). The lifting system may be lifted via the actuator. The actuator may be a manual actuator (e.g., via a crank), or an automatic actuator (e.g., an actuator with a drive motor or the like). The lifting system may be configured to lift the spool from a side position and naturally cause the spool to turn towards an upright position. Once the spool is lifted entirely off of a ground surface, the spool may hang at an angle from the ground towards an upright position or hang entirely in an upright position.

In various embodiments, the method 100 further comprises lowering, via the lifting system, the spool to the ground surface (step 108). Upon lowering the spool to the ground surface, the spool may contact the ground surface and naturally end up in an upright position. For example, the second flange may contact the ground surface first and the first flange may contact the ground surface thereafter resulting in the spool standing in an upright position. In various embodiments, the first flange and the second flange may contact the ground surface simultaneously, for example, when the first flange and the second flange are clamped together.

In various embodiments, the method 100 further comprises releasing the spool from the lifting system in an upright position (step 108). In this regard, the clamping assembly may be released from the lifting system at the attachment portion of the clamp assembly. Upon releasing the spool from the lifting system, the spool may be in an upright position with the clamp assembly still attached to the spool.

In various embodiments, the method 100 further comprises releasing the spool from the clamp assembly (step 110). In this regard, the base clamp portion may be decoupled from the adjustable clamp portion. In various embodiments, the spool may be released from the clamp assembly and the clamp assembly may remained coupled to the lifting system. Although illustrated herein as comprising two separate components that are completely detachable, the clamp assembly is not limited in this regard. For example, in various embodiments, the clamp assembly may include the adjustable clamp portion and the base clamp portion and be configured to stay together upon releasing the spool from the clamp assembly. As such, the clamp assembly may include a stopper disposed in the base clamp portion to provide a maximum gap between engaging members of the base clamp portion and the adjustable clamp portion.

Figure 2:
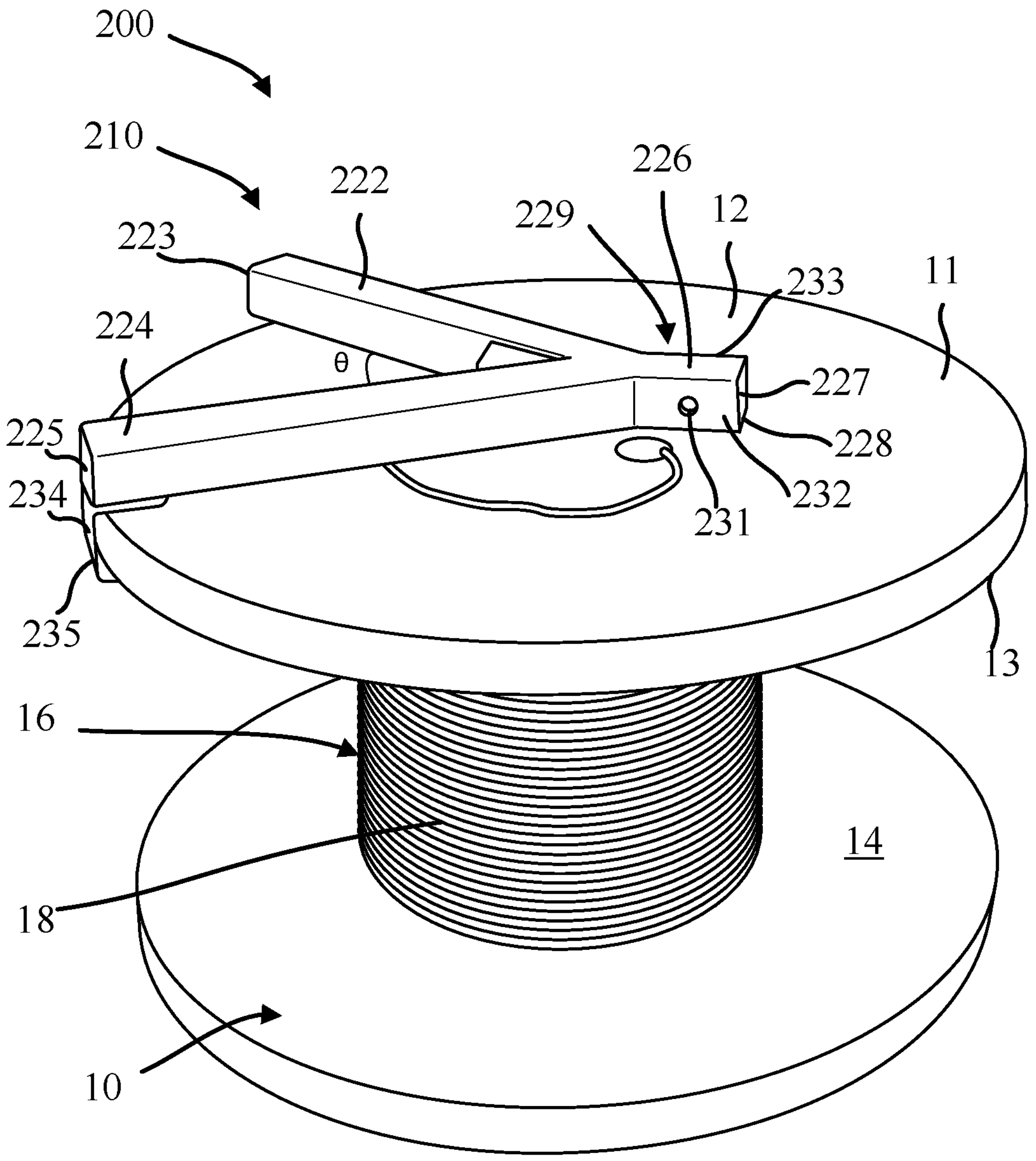
FIG. 2 illustrates a perspective view of a portion of a spool tipping system having a clamp assembly prior to a clamping step of the method from FIG. 1, in accordance with various embodiments.

Referring now to FIG. 2, a perspective view of a portion of a clamp assembly 210 of a spool tipping system 200 engaging a spool 10 during a clamping step of a method for spool tipping (e.g., step 102) is illustrated, in accordance with various embodiments. In various embodiments, the spool 10 comprises a first flange 12, a second flange 14, and a generally cylindrical body 16 extending from the first flange 12 to the second flange 14. In various embodiments, the first flange 12 and the second flange 14 are annular in shape. In various embodiments, the spool further comprises an elongated component 18 wrapped around the generally cylindrical body. In various embodiments, the elongated component 18 may comprise electrical wire, thread, yarn or the like. In various embodiments, the elongated component 18 comprises electrical wire.

In various embodiments, the clamp assembly 210 of the spool tipping system 200 comprises a base clamp portion 220. The base clamp portion 220 may comprise a first leg 222, a second leg 224, and an adjustable clamp receiving portion 226. The first leg 222 may extend from the receiving portion 226 to an engagement end 223. Similarly, the second leg 224 may extend from the receiving portion 226 to an engagement end 225. The first leg 222 and the second leg 224 may be offset by an angle θ. In various embodiments, the angle θ may be between 10 degrees and 170 degrees, or more preferably between 20 degrees and 150 degrees, or more preferably between 30 degrees and 90, or more preferably approximately 40 degrees. Although illustrated as comprising two legs (e.g., first leg 222 and second leg 224), any number of legs are within the scope of this disclosure. For example, the base clamp portion 220 may comprise a single leg or multiple legs.

In various embodiments, the clamp assembly 210 may further comprise an adjustment system 229. The adjustment system 229 may comprise the receiving portion 226. In various embodiments, the receiving portion 226 may comprise an aperture 227 disposed at a first end 228. The aperture 227 may extend through the receiving portion 226 or the aperture 227 may be a blind hole. The aperture 227 is not limited in this regard. The adjustment system 229 may further comprise a first aperture 231 through a first side 232 of receiving portion 226 and a second aperture disposed on a second side 233 of receiving portion 226, the second side being opposite the first side 232. Although illustrated as comprising a first aperture 231 opposite a second hole, any adjustment system is within the scope of this disclosure, for example, notches may be disposed within receiving portion configured to stop complimentary notches of an adjustable clamp portion as described further herein.

In various embodiments, each leg may comprise a flange engagement portion configured to engage a flange (e.g., first flange 12 or second flange 14) of the spool 10. For example, first leg 222 may comprise an engagement portion 234 disposed at engagement end 223 of first leg 222. The engagement portion 234 may be any component configured to engage and/or clamp a portion of a flange (e.g., first flange 12 or second flange 14. In various embodiments, engagement portion 234 comprises a hook 235. The hook 235 may be configured to be disposed on first side 11 of first flange 12 and on second side 13 of first flange 12. In this regard, hook 235 may be configured to retain first flange 12 during lifting and releasing of the spool 10 (e.g., steps 106, 108, and 110 from method 100). Although illustrated as comprising hook 235, any component configured to retain a flange (e.g., first flange 12 or second flange 14) is within the scope of this disclosure. For example, a component configured to retain a flange circumferentially only may be utilized, such as a lip, or the like. In various embodiments, engagement end 225 of second leg 224 may be in accordance with engagement end 223 of first leg 222. For example, second leg 224 may also comprise an engagement portion in accordance with engagement portion 234.

Figure 3:
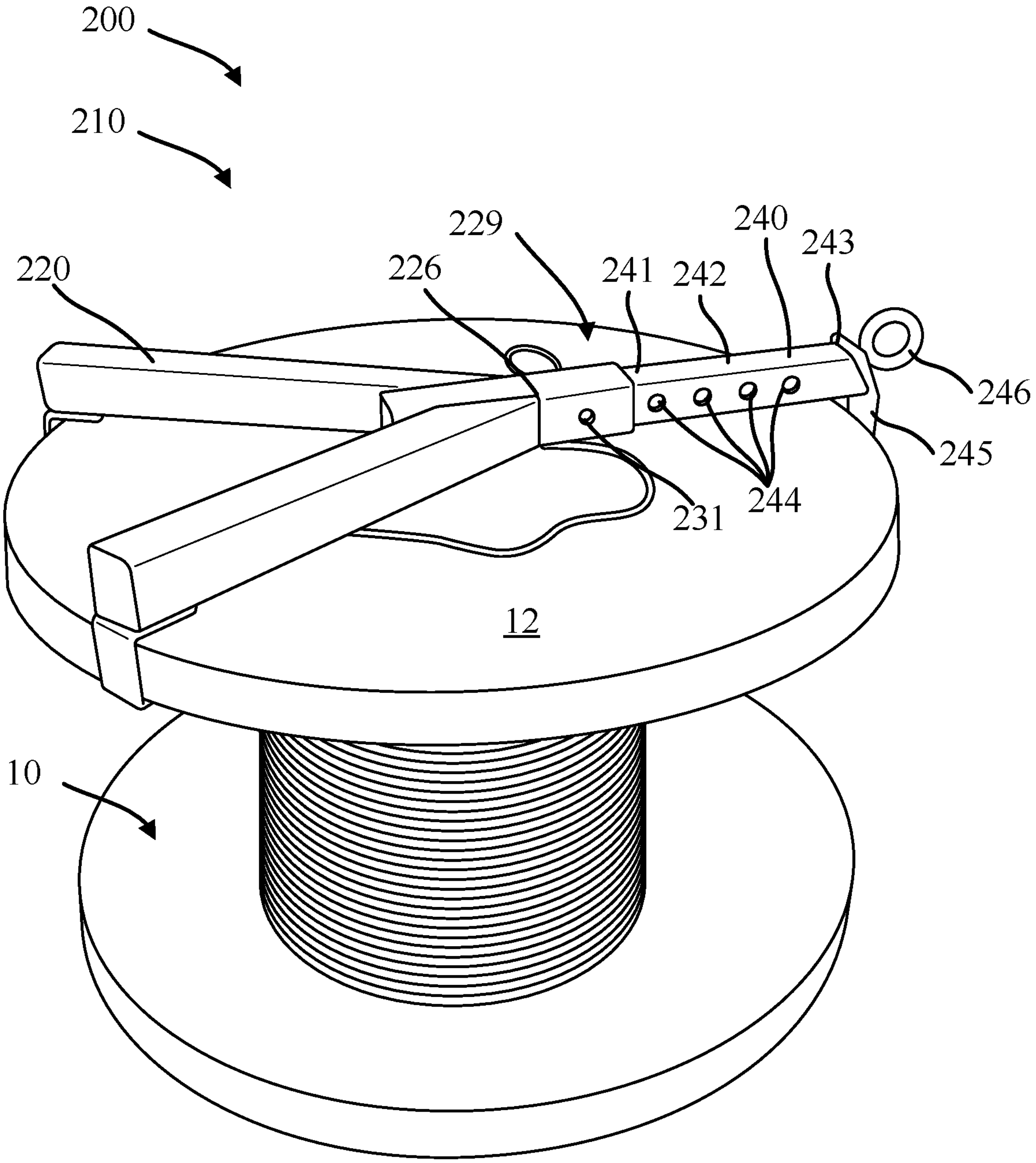
FIG. 3 illustrates a perspective view of a portion of a spool tipping system having a clamp assembly during the clamping step of the method from FIG. 1, in accordance with various embodiments.

Referring now to FIG. 3, a perspective view of a clamp assembly 210 of a spool tipping system 200 engaging a spool 10 during a clamping step of a method for spool tipping (e.g., step 102) is illustrated, in accordance with various embodiments. In various embodiments, the clamp assembly 210 further comprises an adjustable clamp portion 240. The adjustable clamp portion 240 may be configured to be locked to base clamp portion 220 in a clamping configuration to clamp to the spool 10, while the spool is disposed in a side position (e.g., step 102). For example, the adjustable clamp portion 240 may be adjustable within receiving portion 226 of the base clamp portion 220. In this regard, the clamp assembly 210 may be sized and configured to clamp to various flange sizes. This may allow a clamp assembly 210 to adjust to various spool sizes and still retain the spool 10 during the lifting and lowering steps of method 100 from FIG. 1 (e.g., steps 106 and 108).

In various embodiments, the adjustable clamp portion 240 may comprise an elongated member 242 comprising a flange engagement end 243 and a base engagement end 241. The flange engagement end 243 may be configured to engage a flange (e.g., first flange 12 or second flange 14 of the spool). In various embodiments, the flange engagement end 243 may be in accordance with engagement portion 234 of second leg 224. For example, flange engagement end 243 may comprise a hook configured to engage a flange (e.g., flange 12) of a respective spool (e.g., spool 10). In various embodiments, the adjustable clamp portion 240 may further comprise an attachment portion 246 disposed proximate the flange engagement end 243. Although illustrated as being proximate the flange engagement end 243, the attachment portion 246 of clamp assembly 210 may be disposed proximate and engagement end of base clamp portion 220 (e.g., engagement end 223 or engagement end 225 from FIG. 2), in accordance with various embodiments.

In various embodiments, the adjustment system 229 may be configured to vary a retaining diameter of a respective flange 12 of a spool 10. In this regard, method 100 may from FIG. 1, may further including adjusting the clamp assembly 210 via the adjustment system 229 to clamp the clamp assembly to a spool in a side position (e.g., step 102). For example, the elongated member 242 may be configured to translate within receiving portion 226 and adjust a clamp size of clamp assembly 210. The adjustment system 229 may be any system configured to adjust a retaining diameter of clamp assembly 210. The base engagement end 241 may be configured to engage the receiving portion 226 of the base clamp portion 220. In this regard, receiving portion 226 may be configured to receive the elongated member 242 therethrough proximate the base engagement end 241 of the adjustable clamp portion 240. In various embodiments, the adjustment system 229 of the clamp assembly 210 may further comprise an array of apertures 244 disposed along the elongated member 242 of the adjustable clamp portion 240. Each aperture in the array of apertures 244 may be configured to align with the first aperture 231 of base clamp portion 220 of the clamp assembly 210. In this regard, the clamp assembly 210 may be configured to vary in size based on a respective flange for a spool. Although illustrated as comprising an array of apertures 244 in an elongated member 242 interfacing with a receiving portion 226 of a base clamp portion 220, any adjustment system 229 for use in a clamp assembly 210 may be readily apparent to one skilled in the art, and this disclosure is not limited in this manner. For example, the adjustment system 229 may comprise a linear actuator, a rotary actuator, or any other components configured to adjust a size of the clamp assembly 210 relative to a receiving flange (e.g., flange 12).

Figure 4:
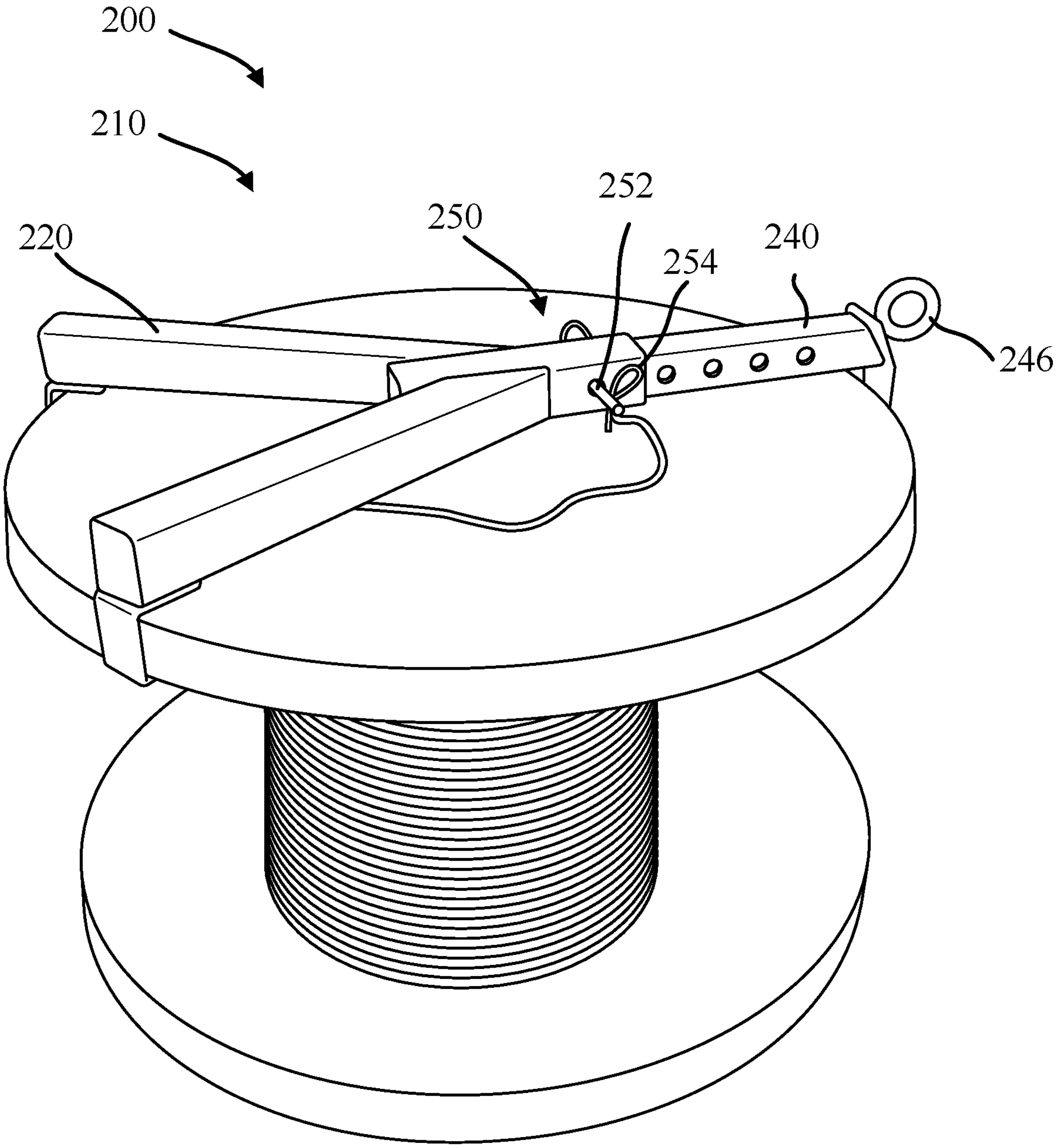
FIG. 4 illustrates a perspective view of a portion of a spool tipping system having a clamp assembly after the clamping step of the method from FIG. 1, in accordance with various embodiments.

Referring now to FIG. 4, a perspective view of a clamp assembly 210 of a spool tipping system 200 engaging a spool 10 after a clamping step of a method for spool tipping (e.g., step 102) is illustrated, in accordance with various embodiments. In various embodiments, the clamp assembly 210 further comprises a locking mechanism 250. The locking mechanism 250 is configured to lock the base clamp portion 220 relative to the adjustable clamp portion 240 in a clamp configuration. A "clamp configuration" as defined herein where the clamp assembly is clamped to a spool (i.e., retaining spool within the clamp assembly 210 while the clamp assembly 210 is moved via a lifting system or the like). In various embodiments, locking the locking mechanism 250 may be a final step of clamping the clamp assembly to the spool as defined in step 102 of method 100. In this regard, upon locking the locking mechanism 250, the clamp assembly may be configured to retain the flange 12 of spool 10 during the lifting steps of method 100 (e.g., steps 106, 108). In this regard, each engagement end of the clamp assembly 210 may engage flange 12. For example, a hook of each engagement end (e.g., engagement end 243, 223, 225) may receive a first axial side and a second axial side of the flange 12 therebetween. In doing so, each engagement end may retain the spool during a method of tipping the spool (e.g., method 100).

In various embodiments, the locking mechanism 250 may comprise a fastener 252 and a spring locking pin 254. The fastener 252 may be disposed through first aperture 231 of adjustment system 229 from FIG. 3 and an aperture in the array of apertures 244 of adjustment system 229 from FIG. 3. In this regard, the locking mechanism 250 may lock the adjustable clamp portion 240 relative to the base clamp portion 220. For example, the locking mechanism may prevent the adjustable clamp portion 240 from traveling linearly within the receiving portion 226 of the base clamp portion 220 during method 100 from FIG. 1. Although illustrated as comprising a fastener 252 and a spring locking pin 254, the locking mechanism 250 may comprise any mechanism configured to lock the base clamp portion 220 relative to the adjustable clamp portion 240 in a clamp configuration as shown. In various embodiments, upon locking the locking mechanism 250, the attachment portion 246 of the clamp assembly 210 may be coupled to an attachment portion of a respective lifting system, as described further herein.

Figure 5:
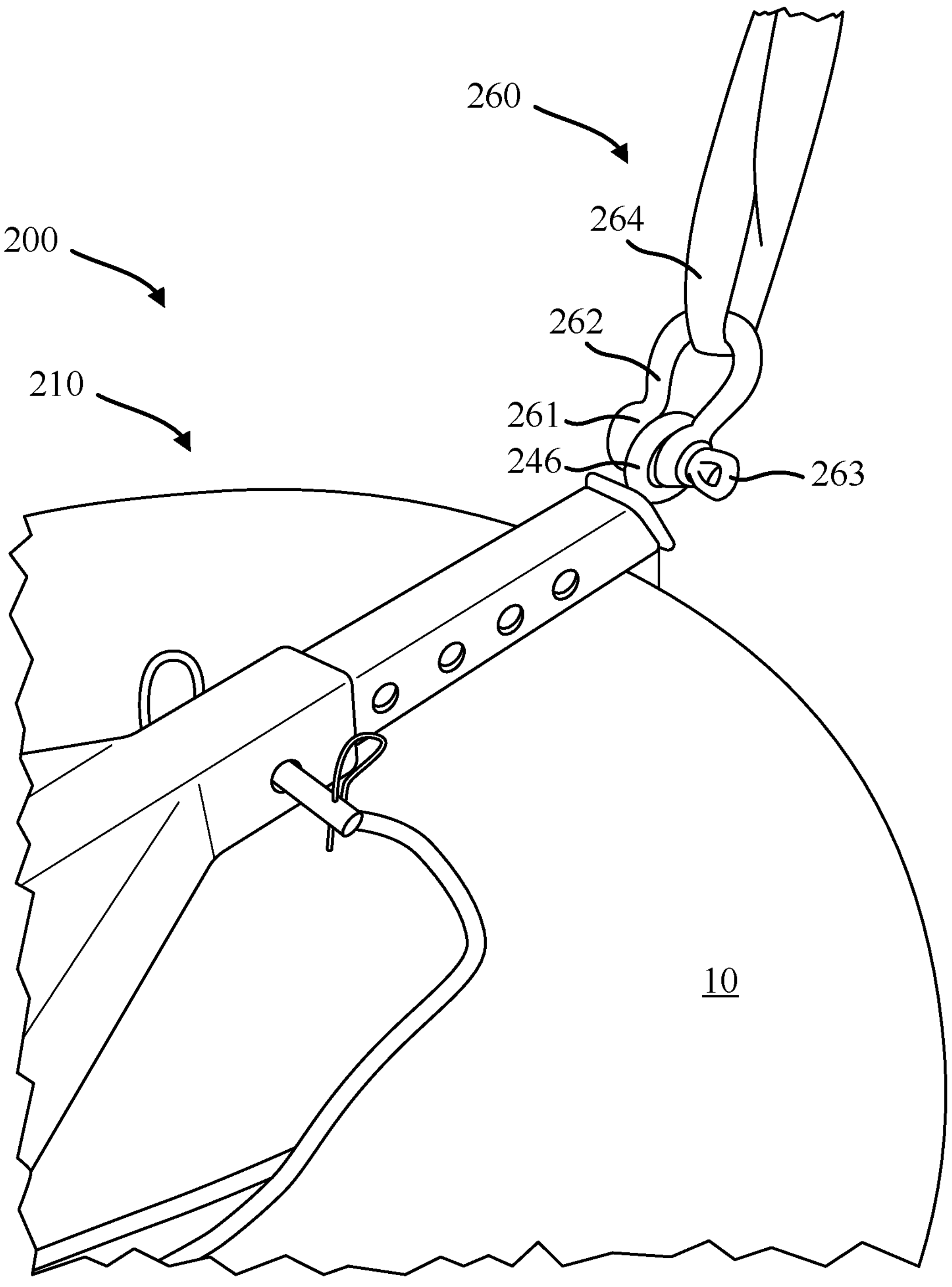
FIG. 5 illustrates a perspective view of a portion of a spool tipping system having a clamp assembly after the coupling step of the method from FIG. 1, in accordance with various embodiments.

Referring now to FIG. 5, a perspective view of a portion of a spool tipping system 200 after coupling a lifting system to the clamp assembly 210 (e.g., step 104 of method 100) is illustrated, in accordance with various embodiments. In various embodiments, the spool tipping system 200 comprises a lifting system 260. The lifting system 260 is configured to couple to the clamp assembly 210 and/or lift the clamp assembly 210 and spool 10 during a method of tipping a spool (e.g., method 100). For example, lifting system 260 may include an attachment portion 262 configured to couple to the attachment portion 246 of the clamp assembly 210. The attachment portion 262 may be coupled to a lifting element 264 of lifting system 260, such as a strap, a rod, a rope, an actuator, or any component capable of lifting the clamp assembly 210 and the spool 10.

In various embodiments, the attachment portion 262 of the lifting system 260 may comprise a forked flange 261 and a fastener 263. The fastener 263 may extend through the forked flange 261 and the attachment portion 246 of the clamp assembly 210 and couple the attachment portion 262 of the lifting system 260 to the attachment portion 246 of clamp assembly 210. As stated previously, it may be readily apparent to one skilled in the art to modify the attachment portions 246, 262 in various ways and achieve the same result. As such, the present disclosure is not limited in this regard, and various attachment components are within the scope of this disclosure. For example, an attachment portion 262 may comprise a snap hook, a simple knot, a fork flange, or any other component configured to attach to the clamp assembly 210 to the lifting system 260. Once the clamp assembly 210 is coupled to the lifting system 260 (e.g., step 104 from method 100), the lifting system 260 may be configured to lift the spool 10 from a side position and tip the spool 10 to an upright position, as described further herein.

Figure 6:
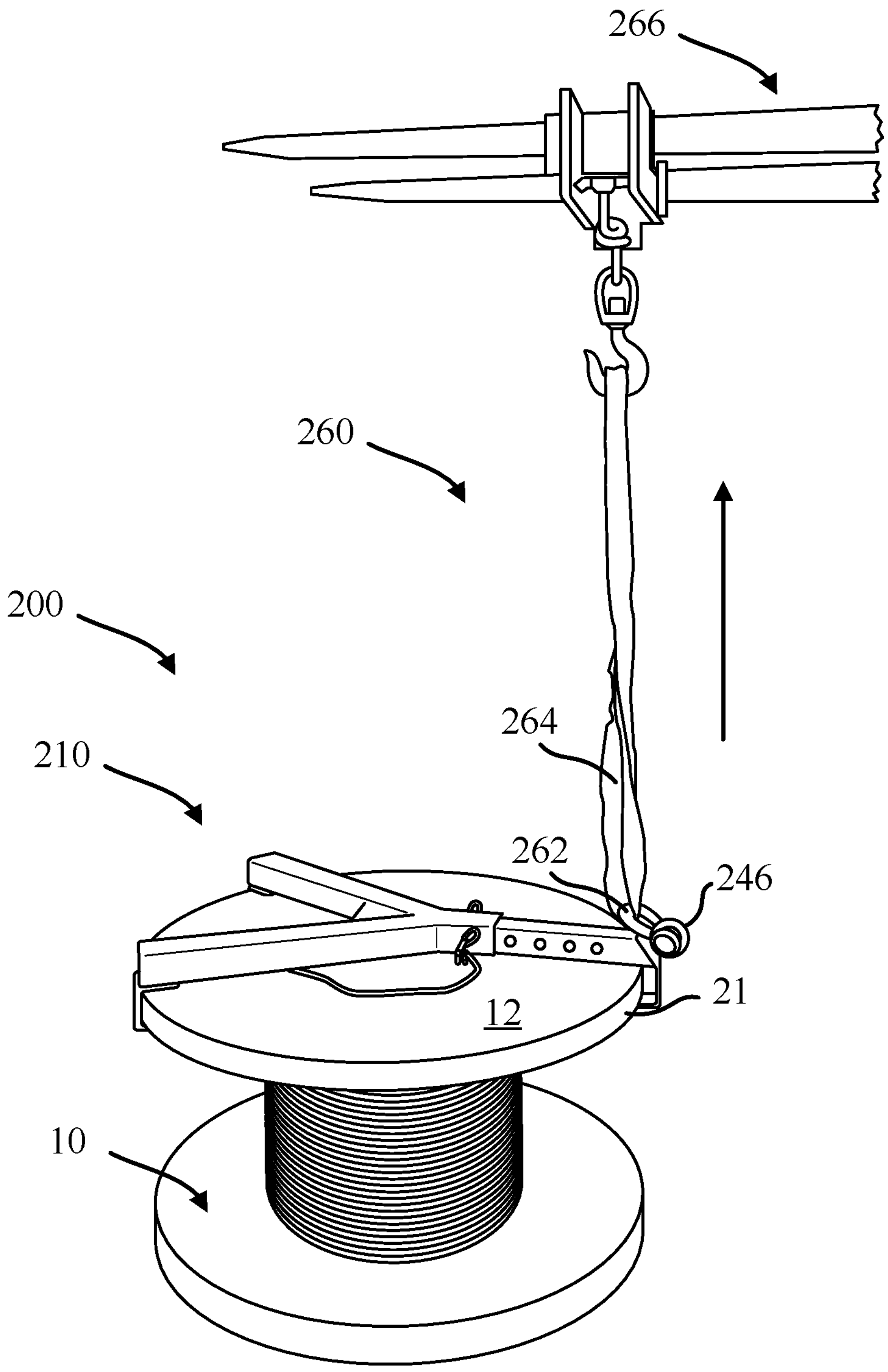
FIG. 6 illustrates a perspective view of a portion of a spool tipping system having a clamp assembly prior to the lifting step of the method from FIG. 1, in accordance with various embodiments.

Referring now to FIG. 6, a perspective view of a portion of a spool tipping system 200 after coupling a lifting system to the clamp assembly 210 (e.g., step 104 of method 100) is illustrated, in accordance with various embodiments. In various embodiments, the lifting system 260 is configured to lift the spool 10 from a side position and tip the spool 10 over into an upright position. Although described herein with respect to specific elements to enable tipping of the spool 10, various configurations of a lifting system to accomplish tipping the spool 10 to an upright position may be readily apparent to one skilled in the art. In this regard, the present disclosure is not limited to a specific lifting system, and any system configurable to lift a spool vertically from a side position to an upright position (e.g., steps 106, 108) is within the scope of this disclosure.

In various embodiments, the lifting system 260 comprises a vertical actuator 266. The vertical actuator 266 may be coupled to the attachment portion 262 of the lifting system

Figure 7:
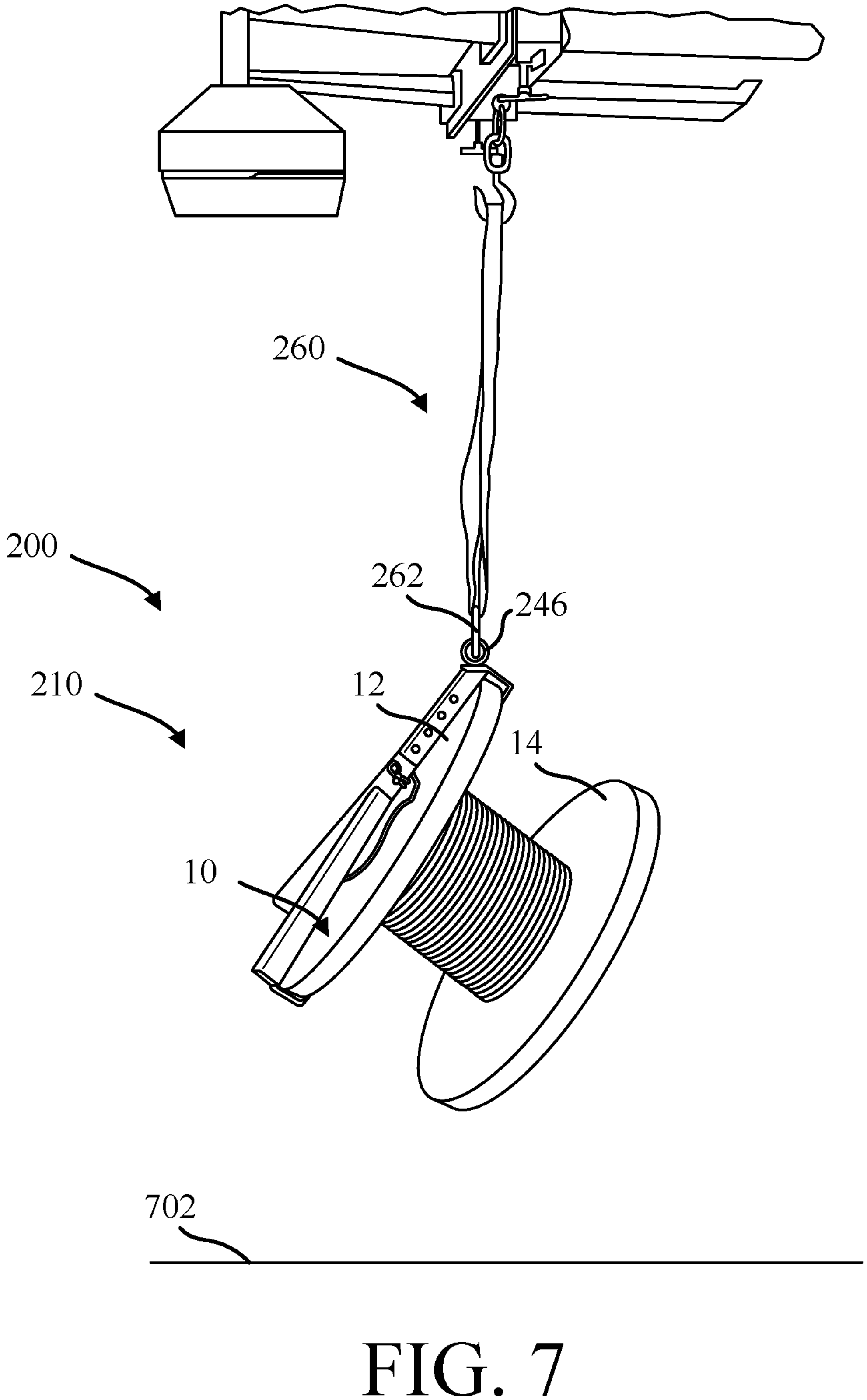
FIG. 7 illustrates a perspective view of a portion of a spool tipping system having a clamp assembly during the lifting step of the method from FIG. 1, in accordance with various embodiments.

260 by any method known in the art. For example, the vertical actuator 266 may be coupled to the attachment portion 262 by a lifting element 264 (e.g., a strap, a rod, a harness, or the like). In various embodiments, the attachment portion 262 of the lifting system 260 and the attachment portion 246 of the clamp assembly 210 may be disposed proximate an outer circumferential surface 21 of flange 12. In this regard, in response to lifting the clamp assembly 210 and the spool 10 vertically, the spool 10 may pivot at least partially about the connection between attachment portion 246 of the clamp assembly 210 and the attachment portion 262 of the lifting system due to gravity (as shown in FIG. 7). In various embodiments, by pivoting the spool at least partially about the attachment between the attachment portion 246 of the clamp assembly 210 and the attachment portion 262 of the lifting system 260, the spool may transition during the lifting process from a side position to a position between upright and as side position, as illustrated in FIG. 7.

Referring now to FIG. 7, a perspective view of a portion of a spool tipping system 200 after lifting a clamp assembly 210 and a spool 10 (e.g., step 106 of method 100) is illustrated, in accordance with various embodiments. As mention previously, upon lifting spool 10 vertically via the lifting system 260, the spool 10 may pivot at least partially about the connection between the attachment portion 246 of the clamp assembly 210 and the attachment portion 262 of the lifting system 260. In this regard, the spool may transition from a side position, as illustrated in FIGS. 2-6 to a partially upright position as illustrated in FIG. 7. In various embodiment, lifting the spool 10 via lifting system 260 may result in the spool being anywhere between a side position and an upright position. In this regard, upon lowering the spool 10 to a ground surface 702, the opposite flange (e.g., flange 14 or the non-clamped flange) may contact ground surface 702 first followed by the clamped flange (e.g., flange 12) resulting in the spool being in an entirely upright position, as illustrated in FIG. 8.

Figure 8:
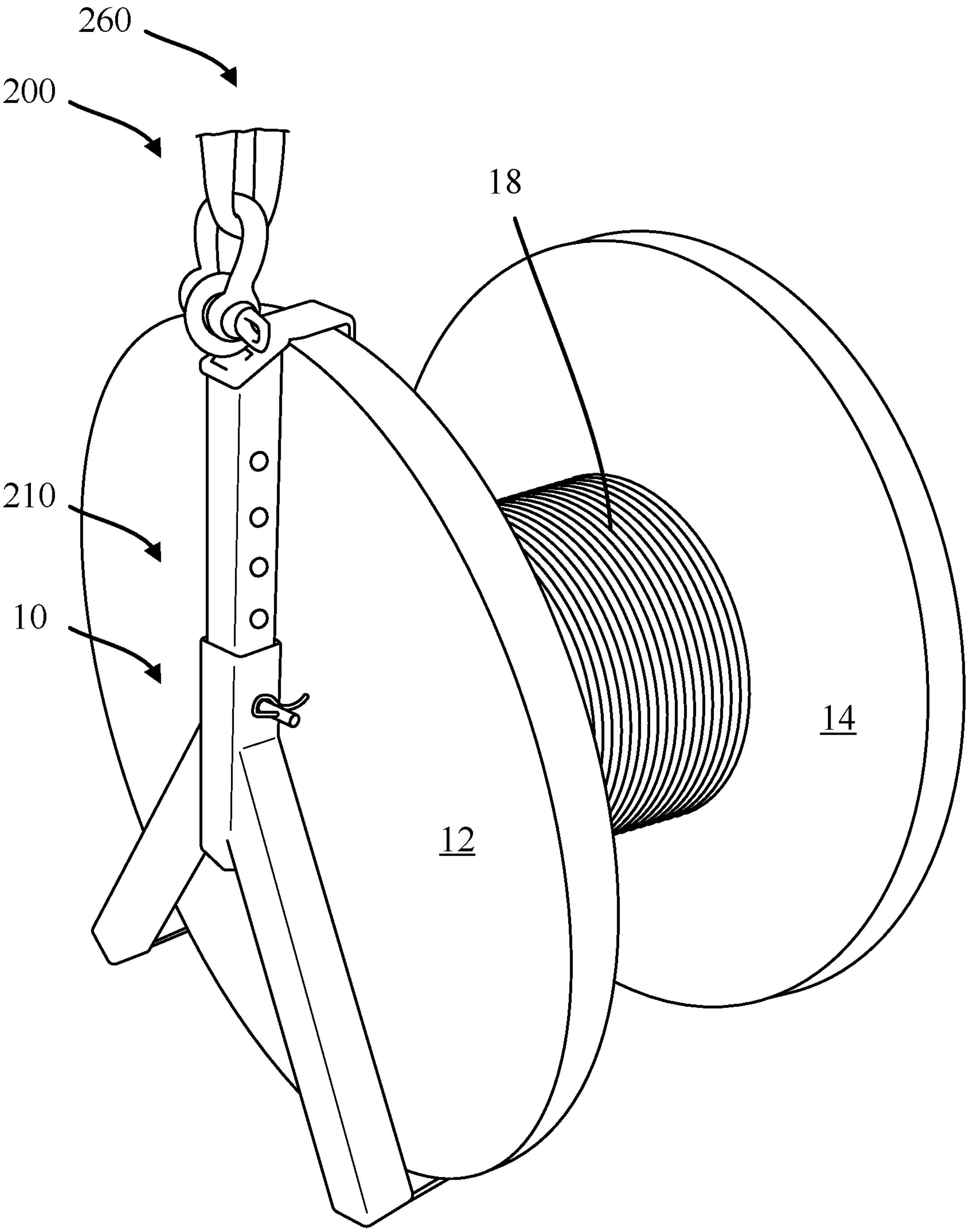
FIG. 8 illustrates a perspective view of a portion of a spool tipping system having a clamp assembly after the lowering step of the method from FIG. 1, in accordance with various embodiments.

Referring now to FIG. 8, a perspective view of a portion of a spool tipping system 200 after lowering a clamp assembly 210 and a spool 10 to a ground surface (e.g., step 108 of method 100) is illustrated, in accordance with various embodiments. Upon lowering the clamp assembly 210 and spool 10 to a ground surface, the spool 10 may be positioned in an upright position. An "upright position," as disclosed herein refers to a portion of a circumferential surface of the first flange 12, and a portion of a circumferential surface of second flange 14 contacting a horizontal surface, such as a ground surface or the like. In contrast, a "side position" as disclosed herein refers to an axial surface of one of the flanges (e.g., first flange 12 or second flange 14) contacts a horizontal surface, such as a ground surface. In this regard, a spool 10 may be configured for use when in an upright position (e.g., the elongated component 18, such as a wire, may be configured to be unwound from the upright position).

Once the spool 10 is in an upright position, the spool 10 may be detached, or released, from the lifting system 260 (e.g., step 110 of method 100), and/or the spool may be de-coupled, or released, from the clamp assembly 210. In this regard, the spool 10 may be completely tipped from the side position to the upright position, as disclosed herein. In various embodiments, the spool tipping system 200 may be more efficient than typical spool tipping systems. In various embodiments, the spool tipping system 200 may result in an at least partially automatic spool tipping system as disclosed herein.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A method for a tipping a spool, the method comprising:

adjusting a size of a clamp assembly relative to a first flange of the spool by sliding an adjustable clamp portion of the clamp assembly into a base clamp portion of the clamp assembly;

locking the adjustable clamp portion of the clamp assembly relative to the base clamp portion of the clamp assembly to clamp the clamp assembly to the first flange of the spool, wherein in response to the locking the clamp assembly, the first flange is disposed within a first hook of the base clamp portion and a second hook of the adjustable clamp portion;

coupling the clamp assembly to a lifting system;

lifting, via the lifting system, the clamp assembly and the spool;

lowering, via the lifting system, the spool and the clamp assembly; and releasing the spool from the clamp assembly in an upright position.

2. The method of claim 1, further comprising releasing the spool from the lifting system.

3. The method of claim 1, wherein lifting the clamp assembly and the spool further comprises actuating the spool vertically via the lifting system.

4. The method of claim 1, further comprising pivoting the spool at least partially about a connection between the clamp assembly and the lifting system in response to lifting the clamp assembly and the spool.

5. The method of claim 1, further comprising clamping the clamp assembly to the spool when the spool is in a side position, the side position including an axial surface of a flange in contact with a horizontal surface.

6. The method of claim 1, wherein the spool further comprises the first flange, a generally cylindrical body, and a second flange, the generally cylindrical body extending from the first flange to the second flange.

7. The method of claim 1, wherein the second flange contacts a horizontal surface before the first flange in response to lowering the spool.

8. The method of claim 1, wherein one of the base clamp portion and the adjustable clamp portion includes a third hook, and wherein in response to the locking the clamp assembly, the first hook, the second hook, and the third hook retain the first flange axially therebetween.

9. The method of claim 8, wherein the first hook, the second hook, and the third hook are spaced apart circumferentially about the first flange in response to the locking the clamp assembly.

10. The method of claim 1, wherein the adjusting the size of the clamp assembly further comprises sliding the adjustable clamp portion within a receiving portion of the base clamp portion.

11. The method of claim 1, further comprising aligning an aperture in an array of apertures that are disposed through one of the adjustable clamp portion and the base clamp portion with a lock receiving aperture disposed through another of the base clamp portion and the adjustable clamp portion prior to the locking the clamp assembly.

12. The method of claim 11, wherein the locking the clamp assembly further comprises coupling a locking mechanism to the aperture and the lock receiving aperture.

13. The method of claim 1, wherein the coupling the clamp assembly to the lifting system includes directly coupling one of the base clamp portion and the adjustable clamp portion to the lifting system.

* * * * *